May 26, 1942.  R. SARDESON  2,284,450
FOOD COOKING DEVICE
Filed July 28, 1939  4 Sheets-Sheet 1
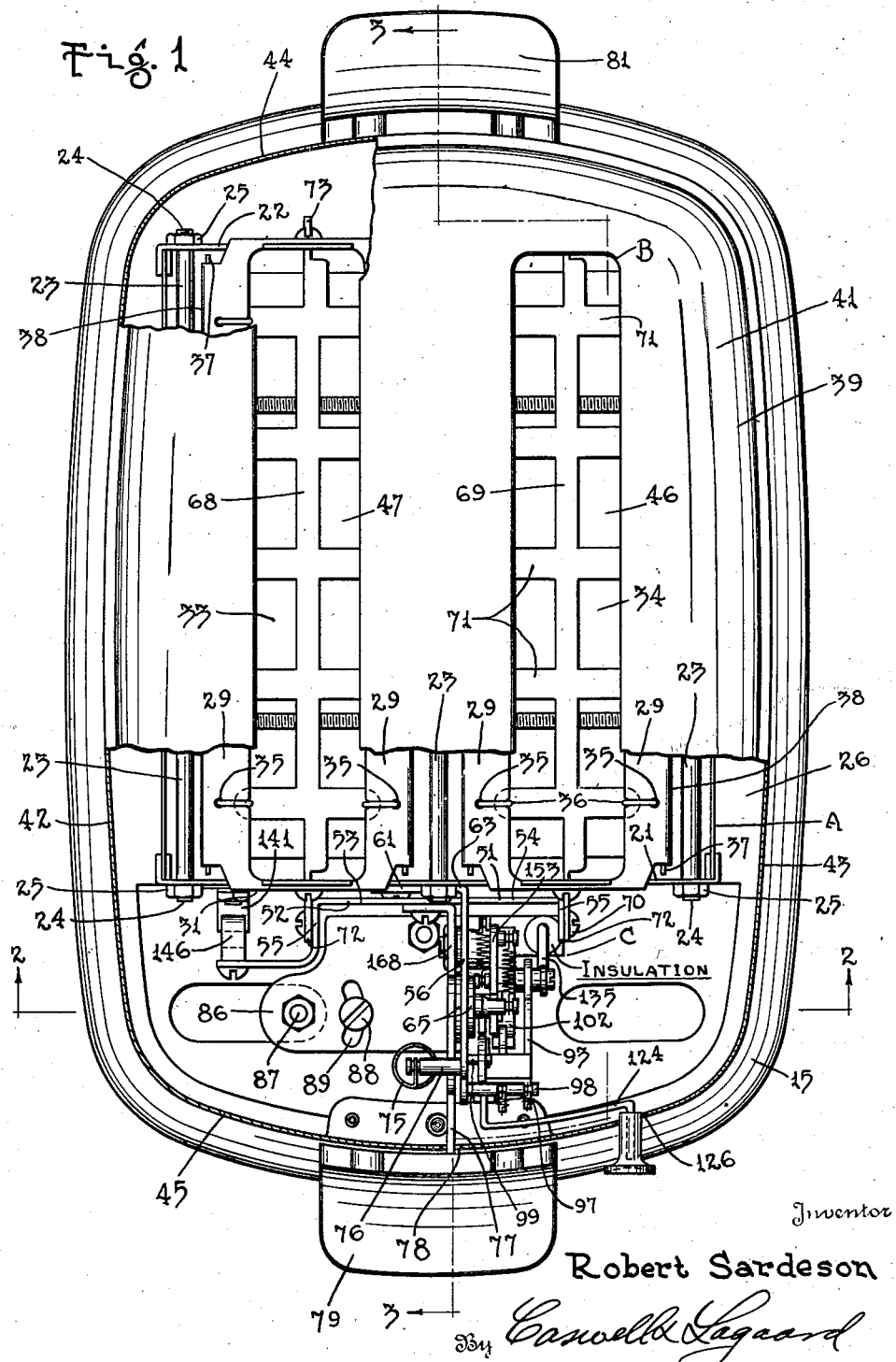

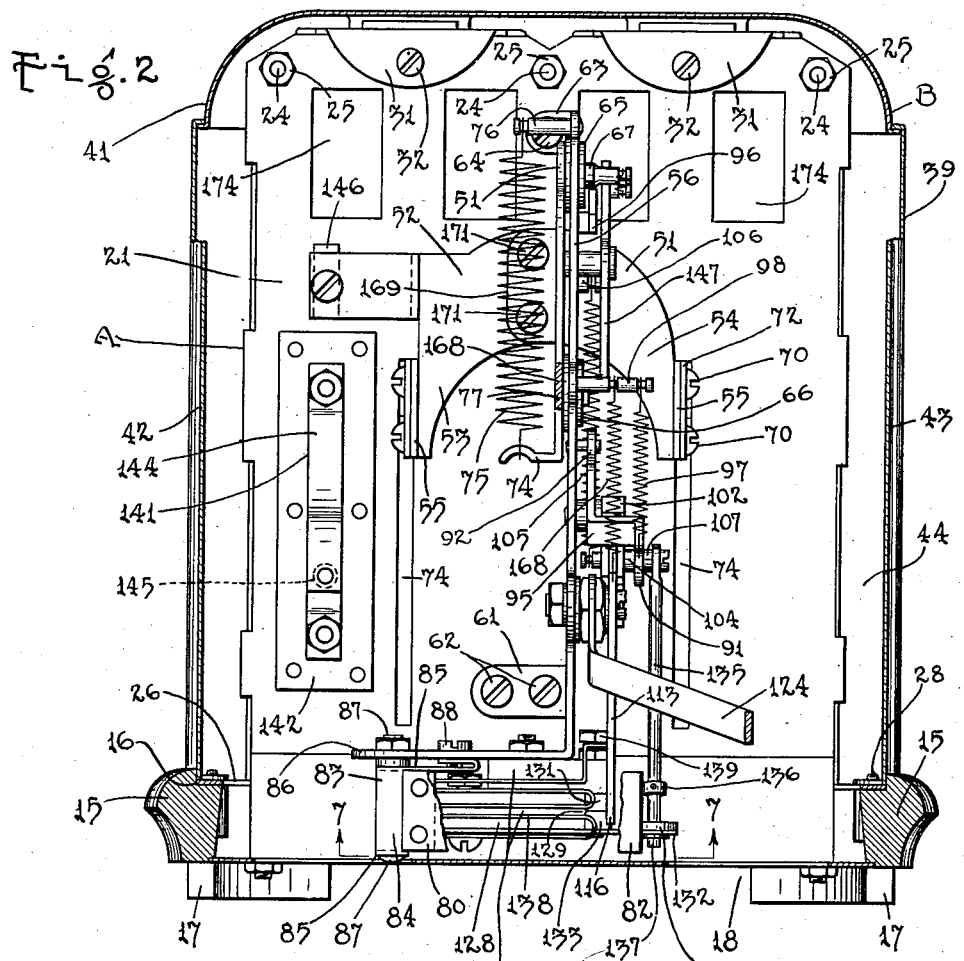
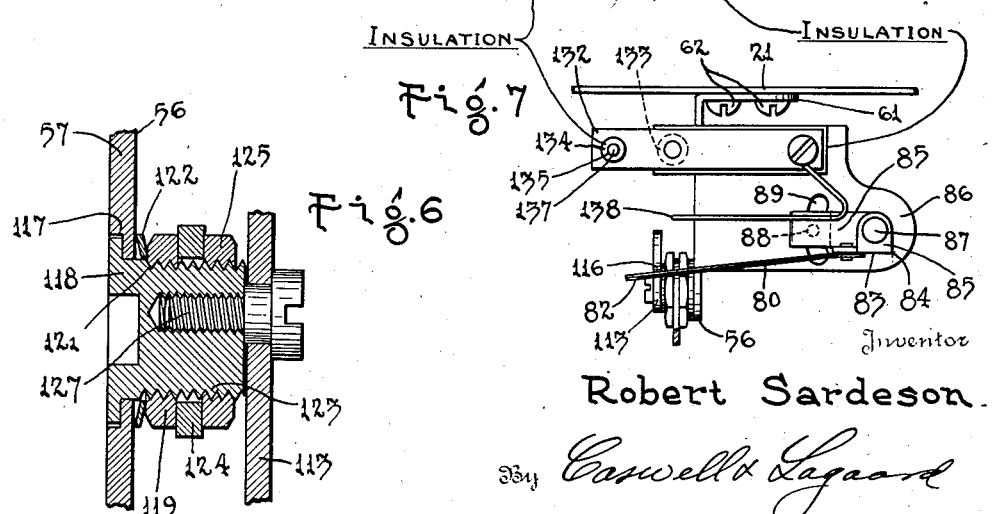

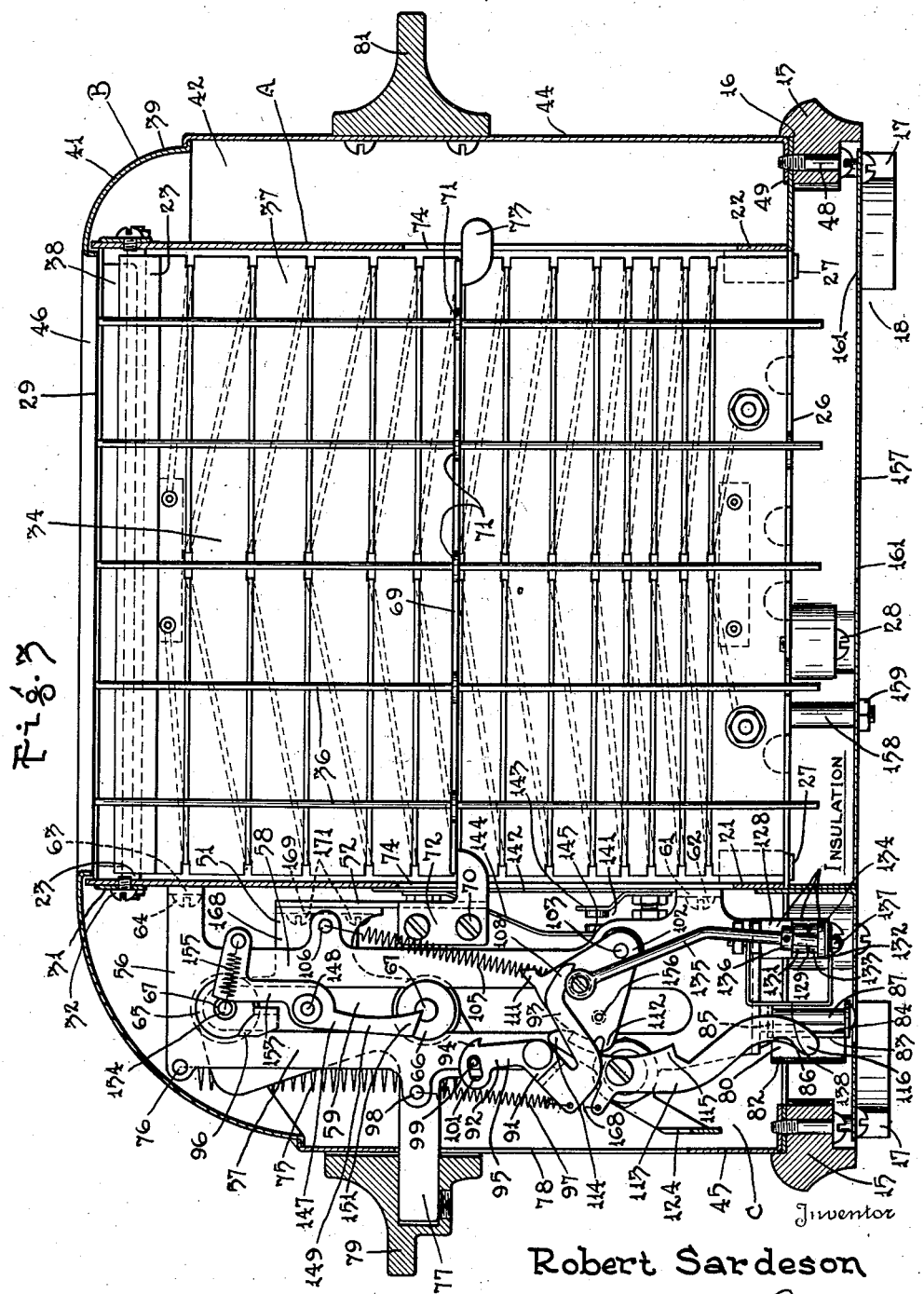

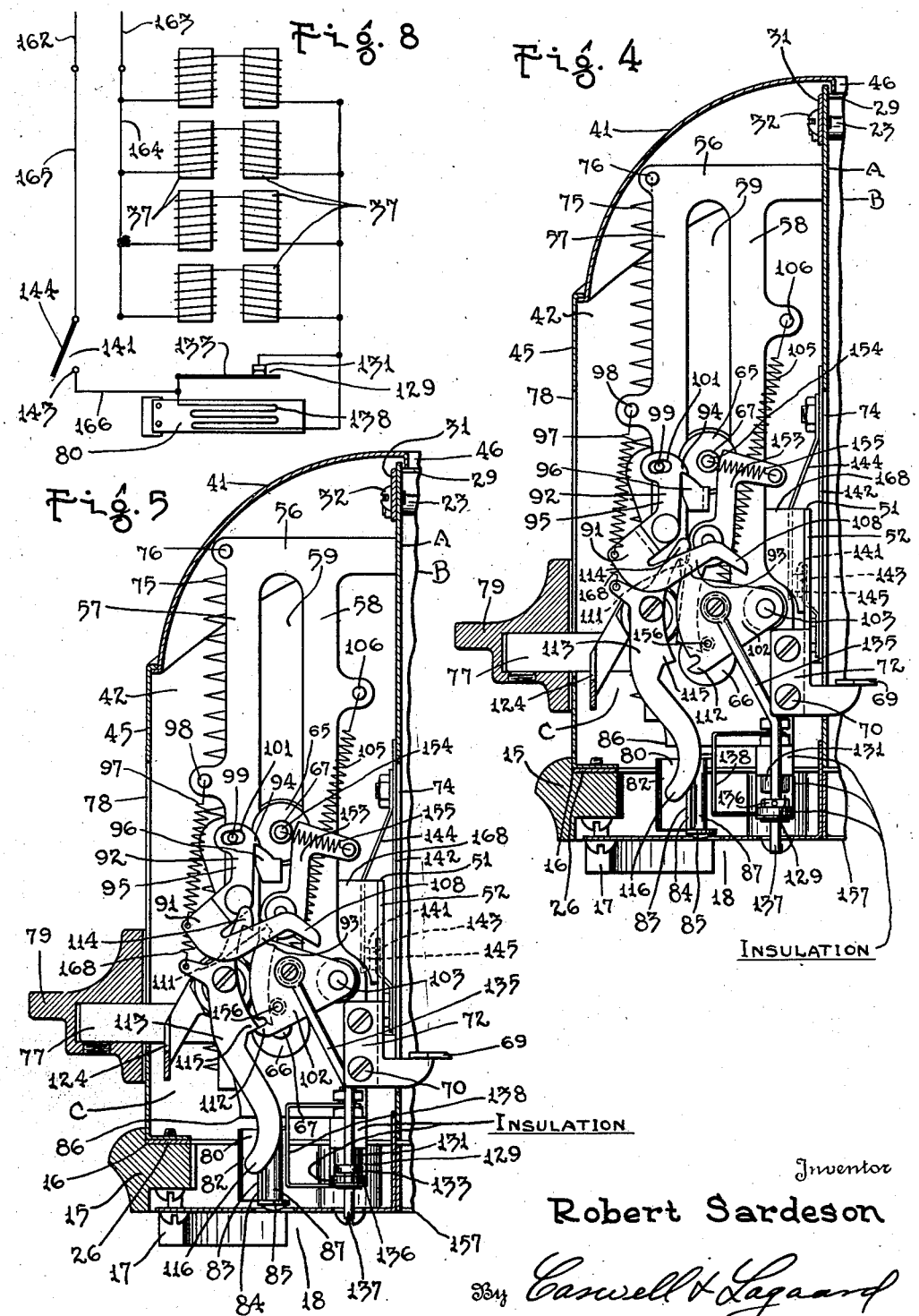

Patented May 26, 1942

2,284,450

UNITED STATES PATENT OFFICE 2,284,450

FOOD COOKING DEVICE

Robert Sardeson, Minneapolis, Minn., assignor to Harold C. Genter, Miami Beach, Fla.

Application July 28, 1939, Serial No. 287,098

5 Claims. (Cl. 219—19)

My invention relates to food cooking devices and to operating mechanisms and timing mechanisms therefor and has for an object to provide a food cooking device which will be highly efficient and practical.

Another object of the invention resides in providing a food cooking device which will be extremely simple in construction and utilize a minimum number of parts.

A still further object of the invention resides in providing a food cooking device operable to procure sufficient timing for the purpose of toasting bread and similar purposes without the use of the so-called conventional clockwork.

A still further object of the invention resides in providing a food cooking device having heating means and food shifting means for moving the food toward and from the heating means and also having resilient means for moving the food shifting means from operative position to inoperative position.

An object of the invention resides in providing a latch for holding the food shifting means in its operative position and further in providing spring biased means tensioned during initiation of a cooking period for urging the latch into releasing position and in further providing a thermally controlled member for restraining movement of said spring-biased means.

A feature of the invention resides in constructing the spring biased means with a movable member adapted to move to a position in which the said member disengages the latch and in employing resilient means tending to urge movement of said member to such position.

Another object of the invention resides in providing a thermally responsive member for controlling the movement of said movable member and holding the same from disengagement from the latch until the completion of a cooking period.

A further object of the invention resides in constructing said movable member in the form of a hammer adapted to give the latch a blow to positively disengage the latch and release the food shifting means at the required time.

Another object of the invention resides in providing a switch operated concurrently with the food shifting means and adapted to be held in closed position by said latch and to be simultaneously released with said food shifting means upon disengagement of the latch.

An object of the invention resides in pivotally supporting said movable member and in causing the resilient means to rotate said member about its pivot in one direction.

A still further object of the invention resides in providing an escapement with pallets and in constructing the movable member with teeth adapted to engage said pallets for controlling the movement thereof.

An object of the invention resides in providing an auxiliary heater for the thermally responsive member and in controlling its energization by movement of the movable member.

Another object of the invention resides in providing means for adjusting the distance between the pivot of said movable member and the pivot of said escapement for varying the depth of engagement of the pallets with the teeth of the pivoted member.

Other objects of the invention reside in the novel combination and arrangement of parts and in the details of construction hereinafter illustrated and/or described.

In the drawings:

Fig. 1 is a plan view of a bread toaster illustrating an embodiment of my invention.

Fig. 2 is an elevational sectional view taken on line 2—2 of Fig. 1.

Fig. 3 is an elevational sectional view taken on line 3—3 of Fig. 1.

Fig. 4 is a fragmentary elevational sectional view similar to Fig. 3 and showing the parts in altered position.

Fig. 5 is a fragmentary elevational sectional view similar to Fig. 4 and showing the parts in still different positions.

Fig. 6 is a sectional detail view of adjustment for the timing device and drawn to an enlarged scale.

Fig. 7 is an inverted view of a portion of the toaster taken on line 7—7 of Fig. 2.

Fig. 8 is a wiring diagram of the invention.

My invention comprises a frame A, best shown in Fig. 1. This frame carries, at one portion of the same, a toaster B, and at another portion of the same a timing device C for timing the operation of the toaster. These parts will now be described in detail.

The frame A is best shown in Figs. 1 and 2 and comprises a base 15 which may be constructed from a suitable plastic material and which extends about the outer confines of the toaster, being open in the center. This base is constructed with a circumferentially extending rabbet 16 therein in which the frame A is disposed. The base 15 is constructed with feet 17 which raise the base above the surface on which the toaster rests and provides spaces 18 therebetween for admission of air into the toaster proper.

Frame A includes two vertically extending spaced plates 21 and 22 which are secured together at their upper ends by means of a number of shouldered rods 23. These rods are formed with threaded reduced ends 24 which pass through the said plates and on which are screwed nuts 25. By means of this construction the respective plates are held in proper spaced relation and are attached to one another at their upper ends. The end plates 21 and 22 are attached to a sub-base 26 by means of ears 27 which extend through said sub-base and are bent over upon the underside thereof. The sub-base 26 is adapted to be received within the rabbet 16 of base 15 and is secured in said rabbet by means of screws 28 which pass through the said base and are threaded into the sub-base.

The toaster B is constructed in the following manner: Extending across the two plates 21 and 22 are a number of supporting bars 29 which have flanges 31 overlying said plates and secured thereto by means of screws 32. These bars are spaced apart to form the toasting ovens which, in the particular toaster illustrated, are two in number and designated by the reference numerals 33 and 34. The bars 29 are drilled at suitable intervals, as designated at 35 to receive guard wires 36 which extend downwardly from the facing marginal edges of the bars and which define the space in which the bread to be toasted is disposed. Beneath the bars 29 are situated the various heating elements 37 which heat the toast ovens 33 and 34. These heating elements are supported on the sub-base 26 in any suitable manner and are held in place at their upper ends between the inner ends of the guard wires 36 and flanges 38 formed on the bars 29.

A case 39 encloses the entire toaster. The case 39 is constructed with a top 41 and side walls 42 and 43 and with end walls 44 and 45 connected thereto. In the top 41 are provided two openings 46 and 47 which register with the spaces between the bars 29 and through which the bread may be inserted into the two ovens 33 and 34. The case 39 is also received within the rabbet 16 in base 15 and the said case is attached to the base 15 by means of screws 48 which extend through the said base and are threaded into brackets 49 issuing from the end walls 44 and 45 of said case.

The toaster B includes a bread carriage 51, which is best shown in Figs. 1 and 2. This bread carriage consists of a plate 52 which has two vertically arranged legs 53 and 54. These legs are each constructed with flanges 55. The carriage in addition includes a plate 168 extending at right angles to the plate 52. The latter plate has a flange 169 overlying the former plate and secured thereto by means of screws 171.

The carriage 51 is mounted for sliding movement in a support 56. Support 56 is constructed from sheet metal and is formed to provide two spaced uprights 57 and 58. Between these uprights is formed a slot 59 extending through said support. The lowermost portion of the support is formed with an attaching lug 61 which is bent outwardly therefrom and which is attached to the end plate 21 by means of screws 62. The upper end of said support is similarly constructed with a lug 63 which is attached to the end plate 21 by means of a screw 64. The plate 168 of carriage 51 is provided with two flanged rollers 65 and 66 which engage the edges of the uprights 57 and 58 at the slot 59 and which are pivoted on pintles 67 attached to the said plate. By means of this construction the carriage is guided for vertical sliding movement.

Within the two ovens 33 and 34 are disposed two bread racks 68 and 69. These bread racks being identical, only the bread rack 69 has been shown in detail and will be described. This bread rack consists of a bar of sheet material which is constructed with lugs 71 projecting outwardly therefrom at the longitudinal edges thereof. This bar has formed, at the ends thereof, ears 72 and 73 which project through vertical slots 74 formed in the end plates 21 and 22. The ear 72 is secured to the flange 55 of carriage 51 by means of screws 70 and the said bread rack is supported thereby. It will readily be comprehended that movement of the carriage in a vertical direction, causes the bread racks to reciprocate vertically within the two toast ovens 33 and 34. These bread carriages serve as a means for shifting the toast from positions adjacent the heating elements to an elevated position in which the same may be removed from the toasting ovens.

The plate 168 of carriage 51, as best shown in Fig. 2 has a lug 74 projecting outwardly therefrom. One end of a tension coil spring 75 is hooked on the said lug and the other of said spring is hooked on another lug 76 formed on the support 56. This spring provides the energy for raising the bread carriage 51 and the two bread racks 68 and 69 when the toasting operation is completed.

In initiating operation of the toaster, the carriage 51 is moved to its lowermost position by means of an arm 77, best shown in Fig. 3. This arm is formed on plate 168 and projects outwardly through a slot 78 in the end wall 45 of the case 39 and has attached to its outer end a finger piece 79 by means of which the said arm may be depressed. When pressure is applied to the said finger piece, carriage is lowered against the action of spring 75 and the bread racks 68 and 69 brought into toasting position. The case 39 is also provided with a stationary finger piece 81, similar to the finger piece 79, which finger pieces may be used for carrying the toaster about.

The timing mechanism C of my invention consists of a strip of bi-metal 80, shown in Figs. 2, 3 and 7, which is rigidly attached to a mounting 83. The mounting 83 consists of a stamping formed of sheet metal, provided with a body portion 84 to which the said strip of bi-metal is riveted and two ears 85 projecting outwardly therefrom. The said mounting is pivotally attached to a bracket 86 issuing outwardly from and forming part of the support 56 on which the carriage 51 is movable. The strip of bi-metal 80 is disposed in a vertical plane and the mounting 83 pivoted through a pintle 87 which extends through and is secured to the bracket 86. The bracket 86 has screwed into it eccentrically with relation to the pintle 87 a lock screw 88 which is movable in a slot 89 formed on the bracket 86. By means of this screw and slot, the position of the free end 82 of the strip of bi-metal 80 may be adjusted toward and from the end plate 21 of frame A.

Pivoted to the upright 57 of support 56 is a bell crank 91 which has two arms 92 and 93. The arm 92 is provided with a catch 94 which forms part of a latch indicated in its entirety by the reference numeral 95 and cooperates with a latch lug 96 issuing outwardly from the plate 168 of the carriage 51. A tension coil spring 97 is hooked to the arm 93 of lever 91 and to a lug 98 secured to the upright 57. This coil spring urges the catch 94 into engagement with the latch lug 96 and serves to hold the carriage in its lowermost position with the bread racks in operative position. The movement of the lever 91 is limited by a pin 99 secured to upright 57, which pin travels in a slot 101 in the said lever.

Pivoted to the upright 58 of support 56 is a pivoted member 102 which is constructed of considerable weight and which is supported for pivotal movement on a stud 103 secured to the said upright. This member has secured to it a lug 104. Attached thereto is a tension coil spring 105 which is further secured to a lug 106 formed on the upright 58 of support 56, best shown in Fig. 2. This tension coil spring serves to move the member 102 upwardly. The member 102 has formed on it an abutment 107 which is adapted to engage a finger 108 on the arm 93 of bell crank 91. This abutment, when the member 102 is in its uppermost position, urges the bell crank to swing in a counter-clockwise direction against the action of spring 97 whereby the latch 94 is disengaged from the latch lug 96, thereby releasing the carriage 51. The pivoted member 102 is so situated that the abutment 107 completely leaves the finger 108 and travels away from the same for a considerable distance. When the pivoted member is released, the abutment 107 travels toward the said finger and serves as a hammer head for giving the said finger and the arm 93, connected thereto, a smart blow. This positively actuates the latch 95 and disengages the catch 94 from engagement with the latch lug 96. The action of the pivoted member 102 is thus that of a hammer and the same will hence hereafter be referred to as a hammer.

Movement of the hammer 102 is controlled by means of two teeth 111 and 112 formed thereon. A lever 113 serving as an escapement is pivoted by a construction, which will be presently described, to the upright 57. This lever is provided with two pallets 114 and 115 adapted to engage the teeth 111 and 112 of the hammer 102. When the lever 113 is swung in opposite directions the pallets 114 and 115 serve to release the teeth 111 and 112, one at a time, giving the said hammer a step-by-step rotation. The lever 113 is urged. The lower end 116 of the lever 113 is disposed in proximity to the end 82 of the strip of bi-metal 80, and is adapted to be engaged thereby and moved through the action of the said strip of bi-metal. When the bi-metal 80 is heated the end 82 thereof moves toward the end plate 21 of frame A and swings the escapement in a manner to move the first pallet 114 out of engagement with the tooth 111 on the hammer 102. At the same time the second pallet 115 is brought into a position to obstruct complete movement of the hammer by engagement with the second tooth 112 thereon. Upon cooling of the strip of bi-metal 80 the same moves back to original position and the second pallet 115 is moved out of engagement with the second tooth 112 and the hammer 102 swings freely upwardly until the hammer head 107 engages finger 108 and swings the bell crank 91 to disengage latch 94 from latch lug 96. This frees the carriage 51 and causes the carriage and bread racks to be raised to inoperative position by means of the spring 75.

The escapement lever 113 is supported by a construction, best shown in Fig. 6. Formed on the upright 57 of support 56 is a socket 117 in which is rotatably mounted a bushing 118. This bushing is threaded at its end, as indicated at 123, to receive a nut 119 which screws up against a shoulder 121 on said bushing. Between the said nut and the surface of the upright 57 is disposed a spring washer 122 which provides friction between the bushing and the upright. A lever 124 is also mounted upon the threaded portion 123 of the bushing 118 and is held in position by means of another nut 125 screwed upon the end of said bushing. This lever projects outwardly through a slot 126 in the case A and serves as a means for manually oscillating the said bushing. Eccentrically mounted in the bushing 118 is a shouldered screw 127 which serves as a pivot for the escapement lever 113. This pivot is disposed above the center of the bushing 118 so that movement of the said bushing causes the pivot to move toward and from the pivot 103 of the hammer 102. By moving the lever 124 in and out, the depth of engagement of the pallets 114 and 115 with the teeth 111 and 112 can be regulated at will.

Attached to the underside of the bracket 86 is an insulating block 128. This block supports a switch indicated in its entirety by the reference numeral 129. This switch includes a fixed contact 131 and a spring arm 132 secured thereto which has a contact 133 adapted to engage the fixed contact 131. The spring arm 132 has secured to it an insulating bushing 134. Pivotally mounted on the hammer 102 is a link 135 formed with a shoulder 136 and a free portion 137 beyond said shoulder. This free portion passes through an opening in the bushing 134 and the shoulder 136 serves to depress the said bushing and swing switch arm 132 to open the switch. The length of the link 135 is such that, when the hammer 102 is in its lowermost position, the switch 129 is open. When the first pallet 114 releases the first tooth 111 and the pivoted member 102 makes its initial movement, link 135 is raised sufficiently to close the switch 129.

For heating the thermally responsive member 80, a heater 138 constructed of resistance wire is employed. This heater is electrically connected to the terminal 139 of the switch 129 and is supported thereby. In normal operation the heater 138 is energized and upon the hammer 102 making its first movement the switch 129 is closed and the heater shunted, thereby de-energizing the heater.

For energizing the heating elements 37 in the toasting ovens 33 and 34, a switch, indicated in its entirety by the reference numeral 141, is employed. This switch utilizes an insulating block 142 which is attached to the outer surface of the end plate 21 of frame A. This switch includes a fixed contact 143 and a spring arm 144 attached to said insulating block. The switch arm 144 has a contact 145 adapted to engage the fixed contact 143. A cam 146 on the arm 53 carried by the carriage 51 serves to engage the switch arm 144 to close the switch 141 when the carriage 51 is lowered. These parts are arranged so that the switch 141 is closed when the carriage 51 is held in latched position by means of the latch 94.

For the purpose of re-setting the hammer 102, a pivoted lever 147 is employed. This lever is pivoted on a stud 148 secured to the carriage 51. Lever 147 has a depending leg 149 formed with a foot 151 thereon, which foot is adapted to engage a pin 156 issuing outwardly from the hammer 102. Lever 147 has an arm 153 which is normally held against an abutment 154 on the plate 168 of carriage 51 by means of a tension coil spring 155, attached to said abutment 154 and to the said lever. When the carriage 51 is depressed the foot 151 engages the pin 156 on hammer 102 and moves the said hammer in a counterclockwise direction. Throughout such movement said pin travels in a downward direction and also in a direction away from the foot 151. Foot 151 is prevented from following the pin 156 due to engagement of the arm 153 with the abutment 154. Therefore pin 156 slides along the under surface of the foot 151. When the pin 156 reaches the end of said foot, the leg 149 passes said pin and the parts become disposed as shown in Fig. 4. The foot 151 is so designed that, after the hammer 102 has been locked in position by the first pallet 114 of escapement 113, the said foot passes the pin 156 and permits the hammer to be released and move upwardly to disengage the latch 94.

To collect the bread crumbs from the toast ovens 33 and 34 a tray 157 is employed which is attached to the underside of the base 15 by means of studs 158 secured to the sub-base 26. These studs are threaded to receive nuts 159 screwed upon the underside of the said tray which hold the tray in position. The tray 157 has ventilating openings 161 therein which permit of the proper circulation of air through the toaster. Openings 174 in the end plate conduct air from the portion of the toaster in which the timing mechanism C is disposed and into the upper portions of the toast ovens 34 and 35 from which said air may pass outwardly from the toaster through the openings 46 and 47 in the top 41 of the case.

In Fig. 8 I have shown a wiring diagram of the invention. Current is procured from two leads 162 and 163 which may be connected to any suitable source of electrical energy. A conductor 164 is connected to the lead 163 and connects with the windings of all of the heating elements 37. The other lead 162 is connected by means of a conductor 165 with the movable arm 144 of switch 141. The fixed contact 143 of said switch is connected through another conductor 166 with the arm 133 of switch 129. The fixed contact 131 of this switch is connected to a conductor 167 which is in turn connected to all of the other terminals of the windings of the heating elements 37. Heater 138 is connected to the conductors 166 and 167. It will be comprehended that the switch 141 controls the energization of all of the heating elements, as well as the heater 138. When the switch 129 is closed heater 138 is shunted by said switch and thus deenergized.

The operation of the invention is as follows: When the toaster is in disuse the parts are positioned as shown in Figs. 1, 2 and 3. Upon exerting downward pressure on the finger piece 79, carriage 51 is moved downwardly. During such movement the hammer 102 is re-set by means of the foot 151 on the lever 147 and the switch 129 controlling the heater 138 is opened. As the said hammer is moved downwardly, the abutment 107 formed thereon is disengaged from the finger 108 of bell crank 91 on which the latch 94 is formed and the said latch is free to move into latching position with respect to the latch lug 96 on carriage 51. As the movement of the finger piece downwardly continues, the carriage is lowered until the latch lug 96 becomes engaged with the latch 94. At such position the pin 156 on hammer 102 is free from the foot 151 and the said hammer is free to move. At the same time switch 144 is closed by means of the cam 146 and the heater 138 and the heating elements 37 in the toast ovens are all energized. The arrangement of parts is now as shown in Fig. 4. The strip of bi-metal 80 now commences to bow and the free end 82 thereof, which engages the finger 116 on lever 113 moves toward the end plate 21 and swings said lever in a counter-clockwise direction, as viewed in Fig. 4.

When the finger piece is initially depressed, hammer 102 is held in its lowermost position by means of the pallet 114 and tooth 111. As the lever 113 swings, the pallet 114 is gradually moved out of engagement with tooth 111. At the same time the pallet 115 on the said lever is moved into a position to be engaged by the other tooth 112 on the hammer 102. When the pallet 114 is finally disengaged the parts become positioned as shown in Fig. 5. It will be noted that, upon release of the hammer 102 through disengagement of pallet 114, the said hammer moves upwardly a distance sufficient to close switch 129. This switch shunts the heater 138 and the said heater is thereby de-energized. The strip of bi-metal 80 now commences to cool and the lever 113 moves in a clockwise direction, as viewed in Fig. 5. Such movement causes the pallet 115 to become disengaged from the tooth 112. It will be noted that in the position of the parts shown in Fig. 5 the abutment 107 is spaced from the finger 108 of bell crank 91. When the strip of bi-metal 80 finally travels sufficiently away from the end plate 21, pallet 115 becomes disengaged from the tooth 112 on hammer 102 and the said hammer is free to swing through the action of spring 105. The head 107 being normally spaced from the finger 108, said hammer is given an opportunity to acquire sufficient movement so that the head 107 gives the said finger a smart blow and positively disengages catch 94 from the latch lug 96. This releases the carriage 51 and spring 75 moves said carriage from operative to inoperative position. During such movement switch 141 is opened and the entire toaster de-energized. The parts are then disposed, as shown in Fig. 3 and the toaster is ready for another cycle of operations.

The advantages of my invention are manifest. An extremely simple construction is provided having a minimum number of parts. The toaster is fully automatic and will operate to toast bread of uniform color regardless of the temperature of the toaster when the toasting operation is initiated. By means of the hammer action the latch holding the bread carriage in position is positively and quickly released so that extremely accurate timing is procured. By utilizing the spring actuated pivoted member for releasing the latch the strain on the thermally responsive member or strip of bi-metal is materially reduced so that a relatively small and thin strip of bi-metal may be employed which is extremely sensitive and accurate in operation. By means of the construction employed both the de-energization of the heating elements for the toast ovens and the release of the bread carriage is effected. By simultaneously adjusting the depth of the engagement of the pallets with the teeth on the hammer different degrees of toasting can be procured and the operation of the toaster at different degrees of initial temperature is unaffected.

Changes in the specific form of my invention, as herein disclosed, may be made within the scope of what is claimed without departing from the spirit of my invention.

Having described my invention, what I claim as new and desire to protect by Letters Patent is:

1. In a food cooking device, heating means, food shifting means for moving the food toward and from the heating means, resilient means for moving the food shifting means from operative to inoperative position, a latch for holding said food shifting means in its operative position, a pivoted member movable in opposite directions, means carried by said pivoted member adapted to engage said latch for disengaging the latch when the pivoted member is moved in one direction, teeth on said pivoted member, an escapement lever having a pair of pallets adapted to engage the teeth on said pivoted member, a thermally responsive member movable in opposite directions during a cooking period for swinging said lever in opposite directions to release said pivoted member, and means for manually adjusting the distance between the pivot of said pivoted member and the pivot of said lever to vary the depth of engagement of said pallets with said teeth.

2. In a periodically operated food cooking device, a movable control member for controlling cooking of the food, yielding means for urging movement of the control member from cooking to non-cooking position, a latch for restraining said control member from movement by said yielding means, a timing device for controlling the release of said control member including a thermally responsive member, a heater for heating said thermally responsive member during a portion of the cooking period to cause movement of the thermally responsive member in one direction, said thermally responsive member cooling during a subsequent portion of the cooking period to cause reverse movement thereof, a pivoted hammer for releasing said latch, yielding means for urging movement of said hammer in one direction, said hammer having two teeth thereon, an escapement having two pallets each for engagement with a tooth and restraining movement of said hammer, said thermally responsive member during heating moving said escapement in one direction to release one of said teeth and cause partial movement of said hammer, means controlled by said hammer during such movement for rendering said heater inoperative, said thermally responsive member during cooling moving said escapement in the opposite direction to release the other tooth and relinquish control of the hammer, said hammer upon release from said escapement moving without restraint to gain sufficient momentum to release said latch.

3. In a periodically operated food cooking device, a movable control member for controlling cooking of the food, yielding means for urging movement of the control member from cooking to non-cooking position, a latch for restraining said control member from movement by said yielding means, a timing device for controlling the release of said control member including a thermally responsive member, a heater for heating said thermally responsive member during a portion of the cooking period to cause movement of the thermally responsive member in one direction, said thermally responsive member cooling during a subsequent portion of the cooking period to cause reverse movement thereof, a movable hammer for releasing said latch, yielding means for urging movement of said hammer in one direction, two holding devices for restraining movement of said hammer by said yielding means, said holding devices being successively operable, said thermally responsive member releasing one of said holding devices during heating to cause partial movement of said hammer, means controlled by said hammer during such movement for rendering said heater inoperative, said thermally responsive member during cooling releasing the other of said holding devices to relinquish control of the hammer, said hammer upon release from said holding devices moving without restraint to gain sufficient momentum to release said latch.

4. In a periodically operated food cooking device, a movable control member for controlling cooking of the food, yielding means for urging movement of the control member from cooking to non-cooking position, a latch for restraining said control member from movement by said yielding means, a timing device for controlling the release of said control member including a thermally responsive member, a heater for heating said thermally responsive member during a portion of the cooking period to cause movement of the thermally responsive member in one direction, said thermally responsive member cooling during a subsequent portion of the cooking period to cause reverse movement thereof, a movable hammer for releasing said latch, yielding means for urging movement of said hammer in one direction, said second named yielding means being weaker than the first named yielding means, two holding devices for restraining movement of said hammer by said yielding means, said holding devices being successively operable, said thermally responsive member releasing one of said holding devices during heating to cause partial movement of said hammer, means controlled by said hammer during such movement for rendering said heater inoperative, said thermally responsive member during cooling releasing the other of said holding devices to relinquish control of the hammer, said hammer upon release from said holding devices moving without restraint to gain sufficient momentum to release said latch.

5. In a periodically operated food cooking device, a movable control member for controlling cooking of the food, yielding means for urging movement of the control member from cooking to non-cooking position, a latch for restraining said control member from movement by said yielding means, a timing device for controlling the release of said control member including a thermally responsive member, a heater for heating said thermally responsive member during a portion of the cooking period to cause movement of the thermally responsive member in one direction, said thermally responsive member cooling during a subsequent portion of the cooking period to cause reverse movement thereof, a movable hammer for releasing said latch, yielding means for urging movement of said hammer in one direction, a movable member adjacent said hammer, one thereof having two teeth and the other having engaging means for engagement with said teeth to restrain movement of said hammer, said thermally responsive member during heating moving said movable member in one direction to release one of said teeth and cause partial movement of said hammer, means controlled by said hammer during such movement for rendering said heater inoperative, said thermally responsive member during cooling moving said movable member to release the second tooth and relinquish control of the hammer, said hammer upon release from said movable member moving without restraint to gain sufficient momentum to release said latch.

ROBERT SARDESON.